Feb. 15, 1966     J. GRAVES ETAL     3,234,909
HEN EXCLUDING EJECTION TYPE POULTRY NEST
Filed Jan. 6, 1964     3 Sheets-Sheet 1
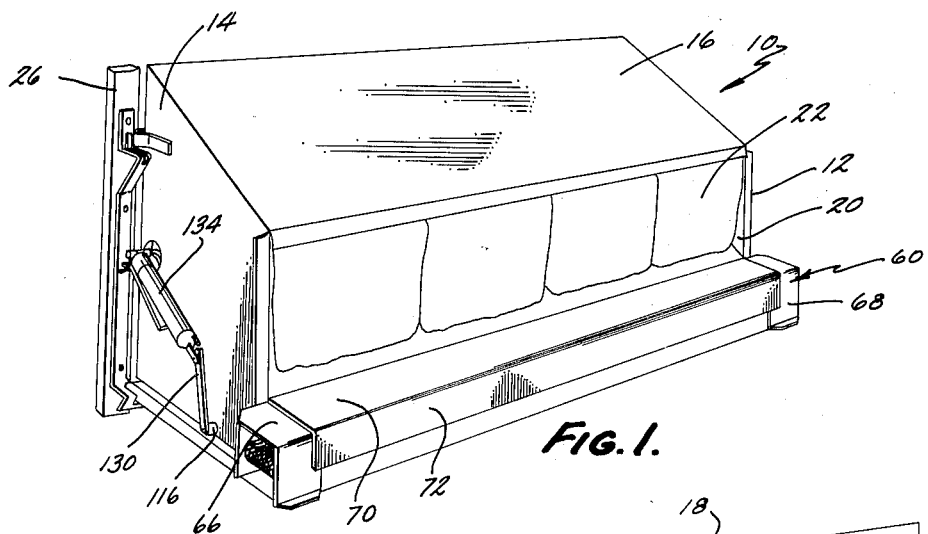
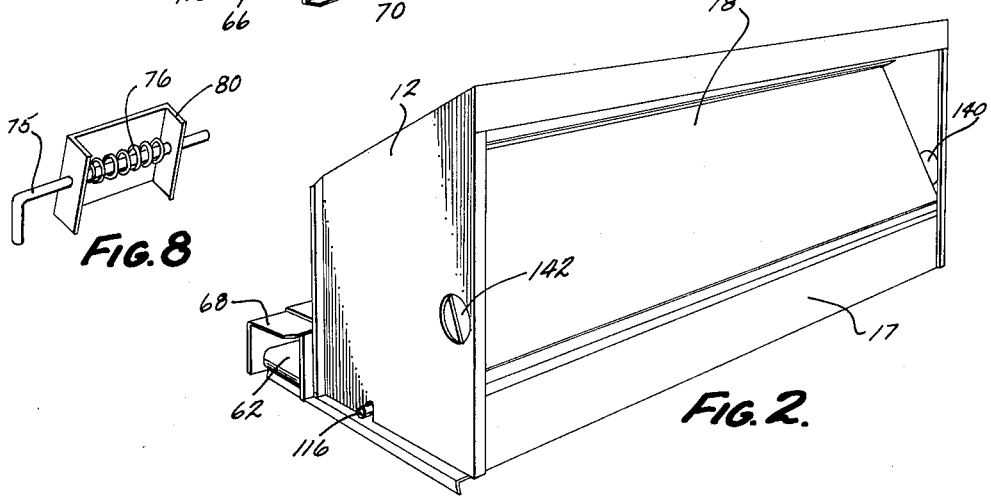
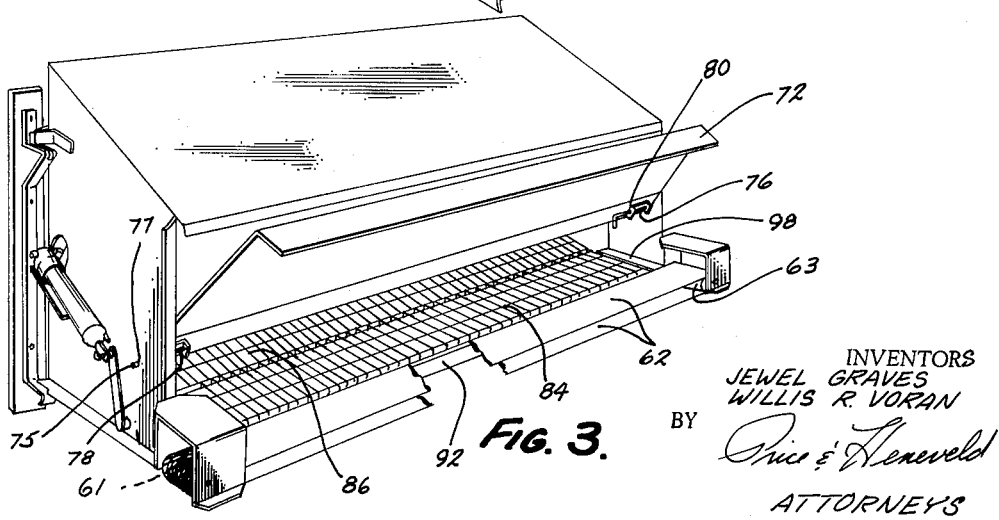
INVENTORS
JEWEL GRAVES
WILLIS R. VORAN
BY
ATTORNEYS Feb. 15, 1966  J. GRAVES ETAL  3,234,909
HEN EXCLUDING EJECTION TYPE POULTRY NEST
Filed Jan. 6, 1964  3 Sheets-Sheet 2
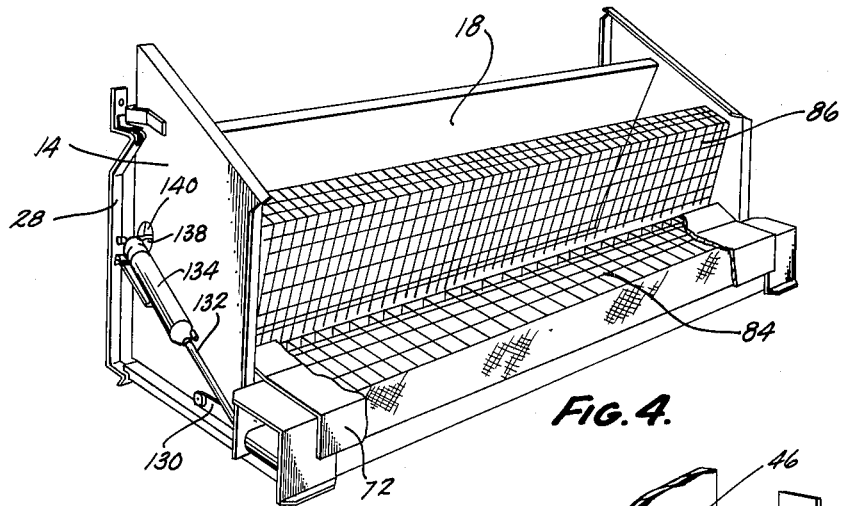
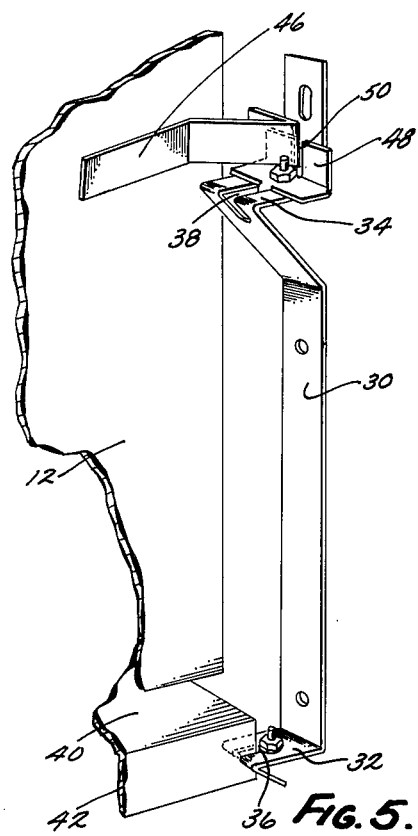
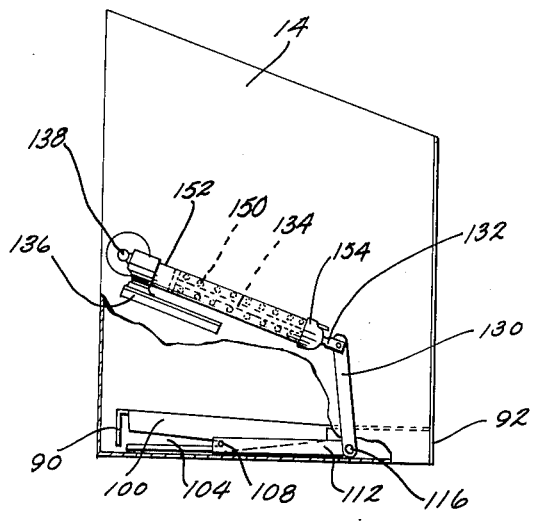
INVENTORS
JEWEL GRAVES
WILLIS R. VORAN
BY
*Price & Heneveld*
ATTORNEYS Feb. 15, 1966  J. GRAVES ETAL  3,234,909
HEN EXCLUDING EJECTION TYPE POULTRY NEST
Filed Jan. 6, 1964  3 Sheets-Sheet 3

INVENTORS
JEWEL GRAVES
WILLIS R. VORAN
BY
*Price & Heneveld*
ATTORNEYS

United States Patent Office 3,234,909
Patented Feb. 15, 1966

3,234,909
HEN EXCLUDING EJECTION TYPE
POULTRY NEST
Jewel Graves, Holland, and Willis R. Voran, Zeeland, Mich., assignors to Big Dutchman, Inc., a corporation of Michigan
Filed Jan. 6, 1964, Ser. No. 335,720
6 Claims. (Cl. 119—45)

This invention relates to poultry nests, and more particularly to an ejection type nest construction.

Poultry nests capable of ejecting and holding the birds out of the nest are extremely useful in controlling the laying habits of the birds. One especially advantageous form of this general type of nest is that having a tiltable nest bottom. This is because (1) the bird can be tipped out of the nest without being swatted with a side wall, back wall or top of the nest, and without being injured between the swinging panel and the bottom of the nest, (2) eggs can be positively and gently rolled out instead of being hit and pushed by a sweeping panel across the nest bottom, where the possibility of breakage is great and (3) waste matter in the nest can be dumped out.

However, elevating the nest bottom necessitates hoisting of the birds also. The load of several birds can be vary substantial, e.g. if this is installed in a community type nest. Also, with ejecting nests, birds roosting in front of the closure element have their rumps slightly inside the nest opening, so that droppings fall into the nest onto the closure element or onto a portion of the nest bottom.

Another difficulty with ejecting type nests is the tendency for a bird to flutter up into the top part of the nest as the pivotal element moves to eject them. By so doing, it is possible for the bird to remain inside the nest as the element moves past. It then is trapped, and injured as the element returns to its initial position.

A further difficulty with prior ejecting nests is the problem of egg breakage when eggs are ejected by being pushed or rolled too rapidly out into a container.

It is therefore one object of this invention to provide a bottom elevating, poultry ejecting nest having excellent capacity for ejecting the poultry, yet with relatively small amount of force from small, inexpensive power units. The structure can readily eject a plurality of fowl from a community nest with complete ease, using a relatively simple ejecting mechanism.

It is another object of this invention to provide an ejecting nest capable of ejecting any and all residual eggs from the poultry nest into a cooperating egg conveyor transverse to the nest. Yet the eggs are moved with a gentle controlled rolling action, without any sweeping or pushing of the eggs along the bottom of the nest, and without causing the egg to roll too rapidly into the container or conveyor receiving the eggs.

It is another object of this invention to provide a bottom tilting ejecting poultry nest having simplified construction, allowing rapid assembly, yet achieving improved leverage for lifting a heavy load with a small air cylinder.

Still another object of this invention is to provide an ejection nest of a construction which prevents a bird from being pinched between moving portions of the nest during ejection and from remaining in the nest to be caught and trapped by the returning ejection panel.

It is a further object of this invention to provide a bottom ejecting nest that prevents any and all droppings from falling into the nest or onto the closure element.

These and several other objects of this invention will become apparent upon studying the following specification in conjunction with the drawings in which:

FIG. 1 is a perspective view of the front of a community nest, comprising one form of the invention;

FIG. 2 is a perspective rear view of the nest in FIG. 1;

FIG. 3 is a perspective view of the front of the nest in FIG. 1, showing the egg conveyor cover lifted;

FIG. 4 is a perspective view of the front of the nest in FIG. 1 with the top removed and the nest bottom tilted;

FIG. 5 is a fragmentary enlarged perspective view of one of the nest mounts;

FIG. 6 is an end, elevational, partially sectioned view of the nest in FIG. 1;

FIG. 8 is an enlarged perspective view of the conveyor cover bracket mechanism from FIG. 3.

Figure 7:
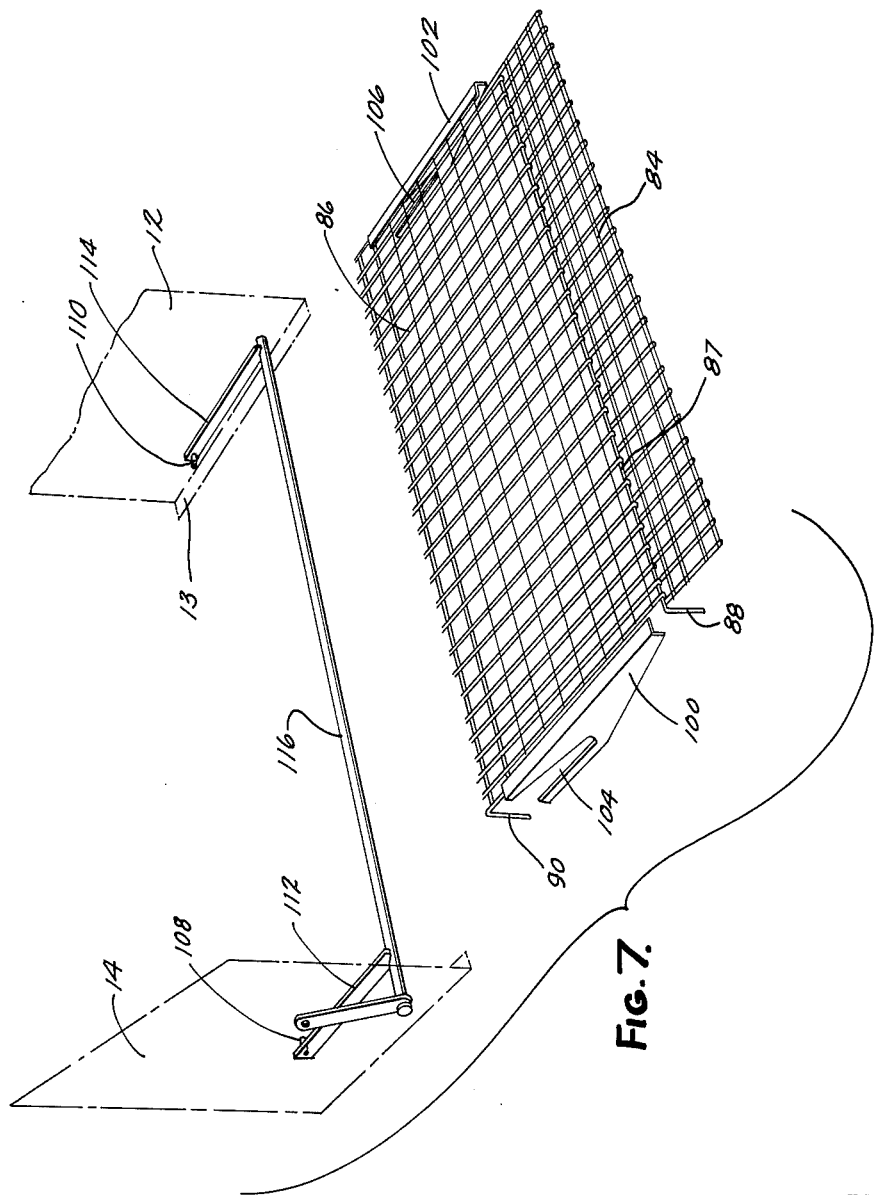
FIG. 7 is a perspective exploded view of the nest bottom and hoist means.

Referring now specifically to the drawings, the invention is disclosed in the preferred form of a community nest 10. It will be realized that the inventive features described hereinafter could be applied to individual nest constructions.

The nest housing 10 includes a pair of end panels 12 and 14, a slanted top panel 16, a back 17 having a forwardly slanted upper portion 18, and a front. The front defines an access opening 20, preferably having draping flexible closure elements 22 therein to prevent disturbance of the laying birds, by external activities.

The complete nest is mounted to supports 26 (FIG. 1) with removable bracket means. These bracket means include a vertically elongated pair of brackets 28 and 30 (FIGS. 4 and 5) mounted to supports 26 or to the wall. At the upper and lower ends of these brackets are two protruding portions 32 and 34 having slots 36 and 38 in their horizontal surfaces. Into the lower horizontal slot 36 of element 32 is slidably fitted a mounting flange affixed to the bottom of the nest housing. This flange includes a horizontal portion 40 and a downwardly depending vertical portion 42, which slidably interfits in slot 36. The lower end of the housing is therefore supported on the platform portion 32.

A second bracket 46 is attached to the end walls of the housing, as by welding or bolts. It projects outwardly, away from the housing, to interengage a clip 48. The clip is bolted through slot 38 of portion 34. The clip has an upwardly extending vertical slot 50 around which bracket 46 extends. Since these bracket connections are on both ends of the housing, the entire poultry house can be lifted off the top support and slid out of the bottom support on both ends to be readily removable and replaceable.

Mounted transversely in front of the housing is an egg conveyor mechanism 60. It extends the length of the nest to convey laid eggs to a common collection point (not shown), using adjacent conveyors (not shown). The conveying means includes a continuous conveying belt 62, which travels around rotatable supports 61 and 63 at opposite ends, to convey eggs which are rolled out of the nest into this receptacle. The ends of the belt are enclosed by inverted, U-shaped mounts 66 and 68. These mounts support and enclose the end rollers for the belt.

The upper conveying surface of the belt is covered by an L-shaped cover means. It includes a horizontal portion 70 spaced vertically above the frontal portion 84 and adjacent the belt 62 to form an egg entry to the conveyor. It also includes a depending outer flange 72 which fits down around the edge of the belt to prevent eggs from rolling off the outer edge. This cover, when in its closed positon, rests upon mounts 66 and 68 in the manner illustrated in FIG. 1. The rear portion of this cover is pivotally mounted to the end walls of the housing by a pair of L-shaped, spring biased plungers 76 and 78, each of which is supported by an inverted U-shaped bracket 80 attached to the underside of the horizontal cover portion 70 at the ends. Each spring fits between the legs of its bracket. The plunger extends through the legs of the bracket from its L-shaped inner end through and into orifices 77 in the end walls of the housing. The cover may be pivotally moved from its lowered position in FIG. 1 to its raised position in FIG. 3 to expose conveyor belt 62 by pivoting it on these plunger pins. Likewise, the cover can be removed from the housing by gripping the bent inner ends of the plunger pins 75 to pull them inwardly against the bias of the springs 76, out of the openings 77 in the housing end panels 12 and 14.

The nest bottom is preferably formed of reticulated screen material to allow droppings to pass. The bottom is actually formed of two portions, a frontal non-tiltable portion 84 and a rearward tiltable portion 86. The rear portion is the major portion of the screen bottom. It forms the ejecting means for the birds and eggs, and also the closure means to prevent entry of birds to the nest when elevated to the position illustrated in FIG. 4. As shown in FIG. 7, the rear portion 86 includes bent frontal loops 87 which are deformed around the rearmost wire of the frontal portion 84, to form a pivotal connection on a common axis. Thus the rear portion pivots on this pivot axis. The rear edge of frontal portion 84 is bent downwardly as at 88 to form a support for the nest bottom along a mounting flange in the nest. Likewise, the rear edge of rear portion 86 is deformed downwardly at 90 to form a support means resting on housing flanges 13 (FIG. 7). The front edge of the frontal portion is supported on the front flange 92 of the nest housing immediately adjacent the conveyor (FIG. 3). The narrow frontal portion 84 is held in its generally horizontal position by a pair of overlapping hold-down flanges 98 (FIG. 3) on opposite ends of the housing and connected to the end panels. The rear portion is free to pivot about its front pivotal axis, however.

Attached to the opposite side edges of the rear major tilting portion 86 of the nest bottom is a pair of sheet metal connectors 100 and 102 which include a pair of respective slots 104 and 106. These slots extend horizontally from the rear of the connectors toward the front of the nest. These slots receive the inwardly extending slide pins 108 and 110 (FIG. 7) which are attached to the rearwardly extending hoisting levers 112 and 114. These levers have their front portion affixed to an elongated pivot bar or rod 116. The rod has its opposite ends rotatably mounted in orifices in the end panels 12 and 14. The sliding pin and slot connection is necessary to allow relative movement between the nest bottom and the hoisting levers since bar 116 is on a pivot axis parallel to, but displaced from and below, the pivot axis of the rear nest portion on the front nest portion. Thus, as the nest is tilted upwardly, the radius of curvature of pins 108 and 110 has a different path than the radius of curvature of the corresponding bracket connectors 100 and 102, so that sliding movement therebetween is necessary to prevent them from binding.

Rod 116 is pivoted by a lever 130 affixed to one end of the rod that is extending out of panel 14. The lever extends radially and upwardly from the rod. Pivotally attached to the upper end of this lever 130 is the extended piston rod 132 of an inexpensive small fluid cylinder 134. The rear end of this fluid cylinder is pivotally attached to end panel 14 of the housing by a bracket 136. The pressurized fluid for this cylinder, preferably air, is supplied through an operatively connected air conduit 138. This conduit extends through suitable openings 140 and 142 in the housing to extend from one nest housing to the next (FIG. 2). Extension of the air cylinder causes pivoting of lever 130, to pivot rod 116 in the manner illustrated in FIG. 4, thereby raising the hoisting means 112 and 114 to lift the rear portion of the nest.

The air cylinder has a compression spring 150 embodied between its piston 152 and the end 154 where rod 132 extends. Upon removal of the air pressure, the spring returns the piston to its retracted condition. The arrangement of the hoisting mechanism provides excellent leverage, so that a relatively small and inexpensive air cylinder can be employed to tilt the nest bottom, even when the nest contains several birds to be ejected.

Normally the nest bottom rear portion is slanted slightly toward conveyor belt 62. The frontal portion of the bottom is substantially coplanar with the belt. Oftentimes eggs remain in the nest and are prevented from rolling across the reticulated screen onto the belt. The pivoted rear portion of the nest bottom therefore, not only gently and safely ejects birds from the nest, but also gently rolls the eggs out as the nest begins to elevate to its erect position in FIG. 4. The frontal portion 84 of the nest which remains stationary and horizontal, provides an effective buffer zone for the rolling eggs. It slows the eggs down and prevents them from breaking by rolling too rapidly out of the nest and into the conveyor enclosure to bump against the depending wall 72. This, therefore, assures removal of the eggs without wiping action of another panel which could break the eggs by rubbing it across the nest bottom.

It will also be noted that the rear wall panel 18 of the nest is tilted upwardly and forwardly. This has been found to be effective in preventing a bird from being left in the nest and trapped under the returning nest bottom to be injured. The back panel provides only a slight clearance between itself and the tilting nest portion so that a bird cannot flutter up into the top of the nest and allow the bottom to move past the bird to allow the bird to drop down behind the mechanism and be subsequently injured. Rather, the bird must move out of the nest when the bottom tilts, since he has no other place to go. It will be understood that the top portion of the housing 16 is preferably slanted forwardly and downwardly so that the birds will not roost upon the housing.

Another difficulty which has been solved with this nest construction is the tendency of birds to leave droppings in the nest when they roost on the conveyor or alternate roosting construction in front of the nest opening. When they do so, the birds tend to place their rumps inside the opening of the nest, with prior type constructions, so that droppings fell into the nest or on the slightly upwardly and inwardly slanting nest bottoms of the prior types. This tilting nest bottom, on the other hand, moves past a vertical plane in its tilting movement, so that the upper edge of the nest bottom is adjacent the opening, while the rear edge is recessed slightly inside. The recession of the rear edge is due to the pivotal mount of the rear nest bottom portion on the frontal nest portion which does not pivot. Therefore, the nest bottom can move past a vertical plane. This produces, therefore, a forward slant which is directly inconsistent with the rump configuration of the chicken which projects upwardly and rearwardly from the bird. The bird which is roosting on the conveyor cover, therefore, cannot get its rump back into the nest opening since it strikes against the upper portion of the forwardly tilting nest bottom. This does not allow it to place its rump in a place where droppings can fall within the confines of the nest. The nest therefore remains substantially clean.

Most of the advantages of this construction have been set forth hereinabove. However, certain additional advantages may occur to those in the art upon studying the preferred form of the invention illustrated. Also, certain obvious modifications and structural details can conceivably be made without departing from the inventive concepts taught herein. These obvious modifications are therefore deemed to be part of this invention, which is to be limited only by the scope of the appended claims and the reasonably equivalent structures to those defined therein.

We claim:

1. A poultry nest comprising: enclosure means including side and top members and bottom means, and forming an access opening for birds; said bottom means including a member mounted on a pivotal axis; hoisting means extending rearwardly along said bottom member away from said opening, including means engaging said bottom member; a pivotal element attached to said hoisting means at the front thereof and mounted to said enclosure means to pivot; lever means extending radially from said pivotal element; and extensible shifting means operably associated with said lever means for pivoting said element and said hoisting means to hoist said bottom member on its pivotal axis.

2. A poultry nest comprising: enclosure means including side, bottom and top members, and forming an access opening for birds; said bottom member having a portion mounted on a pivotal axis; hoisting means extending rearwardly along said bottom member away from said opening, including means engaging said bottom member; said hoisting means and bottom portion having a sliding connection therebetween for movement with respect to each other during hoisting; a pivotal element attached to said hoisting means and mounted to said enclosure means; said pivotal element being on a pivot axis parallel to and beneath said pivotal axis for said bottom portion; and lever means extending radially from said pivotal element to hoist said bottom portion with substantial leverage.

3. An ejection poultry nest apparatus comprising: a nest enclosure having an access opening; a nest bottom in said enclosure, including a major portion of reticulated screen pivotally mounted to tilt upwardly and toward said opening; means for tilting said major bottom portion; egg receiving means outside said nest adjacent said opening, and said nest bottom including a narrow, stationary, non-tilting, reticulated screen, front portion between said tilting portion and said receiving means; said tilting portion having its tilt axis across said non-tilting portion, spaced substantially from said access opening by said front portion, and forming a continuous surface with said front portion in the tilted and untilted positions, to control the rate of egg roll out of said nest into said receiving means when ejected from said tilting portion, and said enclosure having an inner open space adjacent the upper part of said opening to allow said bottom portion to tilt past vertical while remaining in said enclosure.

4. An ejection poultry nest apparatus comprising: a nest enclosure having an access opening; a nest bottom in said enclosure, including a major egg supporting portion pivotally mounted to tilt upwardly and toward said opening; means for tilting said major bottom portion; egg conveying means outside said nest adjacent said opening, including cover means thereon for bird movement thereover, and an egg entry communicant with the nest; and said nest bottom including a narrow, stationary, non-tilting front portion between said tilting portion and said conveying means; said tilting portion having its tilt axis across said non-tilting portion, spaced substantially from said access opening by said front portion, and forming a continuous surface with said front portion in the tilted and untilted positions, to control the rate of egg roll out of said nest onto said conveying means when ejected from said tilting portion.

5. An ejection poultry nest comprising: an enclosure having an access opening; a nest bottom in said enclosure including a first tiltable portion, and a second non-tiltable portion; egg conveying means adjacent said opening to receive eggs ejected from the nest; said second portion being between said first portion and said egg conveying means to act as a buffer for slowing down rolling eggs from the tiltable portion to said conveying means; said bottom portion being of reticulated screen sections pivotally connected to each other; hold-down means over said non-tiltable portion; powered tilting means operably connected to said first portion to tilt it; hoisting means extending rearwardly along said bottom member away from said opening, including means engaging said bottom member; a pivotal element attached to said hoisting means and mounted to said enclosure means; lever means extending radially from said pivotal element; and shifting means operably associated with said lever means for pivoting said element and said hoisting means to hoist said bottom member on its pivotal axis.

6. A nest structure comprising: an enclosure having side, top and back panels, and a nest bottom, and forming an access opening in the front; said nest bottom being pivotally mounted about an axis adjacent said opening but displaced slightly toward said back panel; means for pivoting said bottom to eject birds and close off said opening; and said bottom being movable on its pivot axis past a vertical plane with the upper edge thereof against said front, to prevent a bird's rump from being placed inside said front opening.

References Cited by the Examiner
UNITED STATES PATENTS

| | | | |
|---|---|---|---|
| 3,027,871 | 4/1962 | Peterson | 119—45 |
| 3,157,156 | 11/1964 | Peterson et al. | 119—45 |
| 3,164,129 | 1/1965 | Rigterink | 119—45 |

SAMUEL KOREN, *Primary Examiner.*

ALDRICH F. MEDBERY, *Examiner.*